United States Patent
Kim et al.

(10) Patent No.: US 9,667,850 B2
(45) Date of Patent: May 30, 2017

(54) PORTABLE DEVICE AND CONTROL METHOD THEREOF

(71) Applicant: LG ELECTRONICS INC., Seoul (KR)

(72) Inventors: Yongsin Kim, Seoul (KR); Doyoung Lee, Seoul (KR); Hyorim Park, Seoul (KR)

(73) Assignee: LG Electronics Inc., Seoul (KR)

( * ) Notice: Subject to any disclaimer, the term of this patent is extended or adjusted under 35 U.S.C. 154(b) by 267 days.

(21) Appl. No.: 14/092,511

(22) Filed: Nov. 27, 2013

(65) Prior Publication Data

US 2015/0077580 A1 Mar. 19, 2015

(30) Foreign Application Priority Data

Sep. 16, 2013 (KR) .......... 10-2013-0111029

(51) Int. Cl.
*H04N 5/232* (2006.01)
*H04N 5/225* (2006.01)
*H04N 5/247* (2006.01)

(52) U.S. Cl.
CPC ....... *H04N 5/23203* (2013.01); *H04N 5/2258* (2013.01); *H04N 5/23206* (2013.01); *H04N 5/23238* (2013.01); *H04N 5/23241* (2013.01); *H04N 5/247* (2013.01)

(58) Field of Classification Search
CPC .................................. H04N 5/23203
USPC ................................. 348/211.99
See application file for complete search history.

(56) References Cited

U.S. PATENT DOCUMENTS

| 8,576,321 | B2 * | 11/2013 | Ishida | H04N 5/23238 348/333.06 |
| 2004/0142772 | A1 * | 7/2004 | Asakura | A63B 24/0021 473/407 |
| 2006/0044396 | A1 * | 3/2006 | Miyashita | H04N 5/2252 348/207.99 |
| 2006/0183576 | A1 * | 8/2006 | Lindsey | A63H 33/18 473/570 |

(Continued)

FOREIGN PATENT DOCUMENTS

| JP | 2006-33394 A | 2/2006 |
| KR | 10-2009-0016246 A | 2/2009 |
| KR | 10-2010-0092281 A | 8/2010 |

*Primary Examiner* — Roberto Velez
*Assistant Examiner* — Cynthia Segura
(74) *Attorney, Agent, or Firm* — Birch, Stewart, Kolasch & Birch, LLP

(57) ABSTRACT

Disclosed is a portable device including a first camera unit configured to capture a first image and a second camera unit configured to capture a second image; a communication unit configured to transmit and receive data to and from an external device; and a processor configured to control the first camera unit, the second camera unit, and the communication unit, wherein the processor is further configured to: detect a state of a third camera unit contained in the external device when activating at least one of the first camera unit and the second camera unit, the state of the third camera unit including an active state and an inactive state, detect a direction of the third camera unit when the third camera unit is in the active state, and activate at least one of the first camera unit and the second camera unit in a different direction from the detected direction of the third camera unit.

18 Claims, 11 Drawing Sheets

(56) References Cited

U.S. PATENT DOCUMENTS

| | | | |
|---|---|---|---|
| 2007/0296820 A1* | 12/2007 | Lonn | G06K 9/00248 |
| | | | 348/207.99 |
| 2010/0097442 A1* | 4/2010 | Lablans | G03B 5/00 |
| | | | 348/36 |
| 2010/0097443 A1* | 4/2010 | Lablans | G03B 37/00 |
| | | | 348/36 |
| 2011/0043669 A1* | 2/2011 | Ishida | H04N 5/23238 |
| | | | 348/264 |
| 2012/0320169 A1 | 12/2012 | Bathiche | |
| 2013/0147837 A1 | 6/2013 | Stroila | |
| 2013/0150004 A1* | 6/2013 | Rosen | H04W 8/22 |
| | | | 455/414.1 |
| 2013/0150122 A1* | 6/2013 | Kulas | H04M 1/0254 |
| | | | 455/556.1 |
| 2013/0210563 A1* | 8/2013 | Hollinger | H04N 5/2252 |
| | | | 473/570 |
| 2013/0250047 A1* | 9/2013 | Hollinger | H04N 5/2252 |
| | | | 348/36 |

\* cited by examiner

< FRONT SURFACE OF PORTABLE DEVICE >   < REAR SURFACE OF PORTABLE DEVICE >

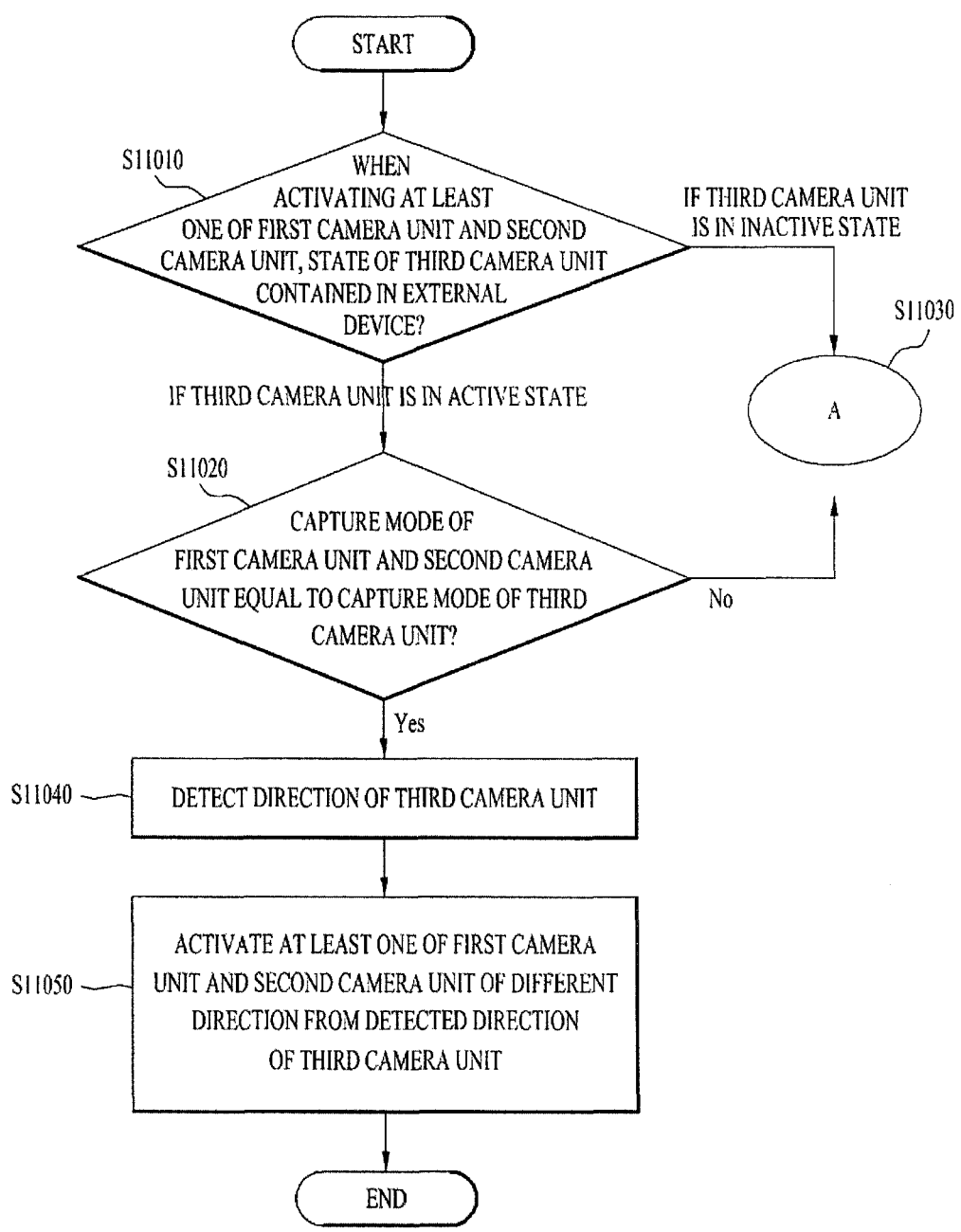

PORTABLE DEVICE AND CONTROL METHOD THEREOF

This application claims the benefit of Korean Patent Application No. 10-2013-0111029, filed on Sep. 16, 2013, which is hereby incorporated by reference as if fully set forth herein.

BACKGROUND OF THE INVENTION

Field of the Invention

The present disclosure relates to a portable device, and more particularly to a device to control a plurality of camera units contained in a portable device and a control method thereof.

Discussion of the Related Art

With recent technological advances, various shapes of devices have been commercialized. In particular, devices are reducing in size owing to advanced integrated circuit technologies. As a result, users often wear or carry a plurality of devices, rather than a single device, according to functions and use purposes of devices. As such, users may capture desired images using a plurality of camera units contained in a plurality of devices. In this case, capturing an image using a plurality of camera units contained in a plurality of devices enables more efficient image capture at various angles, as compared to the case of using a plurality of camera units contained in a single device.

Upon image capture using the plurality of devices, a single device containing a plurality of camera units may need to determine which one of the plurality of camera units is activated in preference to the others.

SUMMARY OF THE INVENTION

The present disclosure is directed to a portable device and a control method thereof that substantially obviate one or more problems due to limitations and disadvantages of the related art.

An object of the present disclosure is to provide a method and device of controlling activation of a plurality of camera units contained in a portable device according to the state and orientation of a camera unit contained in an external device. In particular, an object of the present disclosure is to provide a method of preferentially activating any one camera unit among a plurality of camera units contained in a portable device, which has a different image capture direction from an image capture direction of a camera unit contained in an external device.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a portable device according to one embodiment includes a first camera unit configured to capture a first image and a second camera unit configured to capture a second image; a communication unit configured to transmit and receive data to and from an external device; and a processor configured to control the first camera unit, the second camera unit, and the communication unit, wherein the processor is further configured to: detect a state of a third camera unit contained in the external device when activating at least one of the first camera unit and the second camera unit, the state of the third camera unit including an active state and an inactive state, detect a direction of the third camera unit when the third camera unit is in the active state, and activate at least one of the first camera unit and the second camera unit in a different direction from the detected direction of the third camera unit.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings:

FIGS. 9 to 11 are flowcharts of a control method of a portable device according to an embodiment.

DETAILED DESCRIPTION OF THE INVENTION

Although the terms used in the following description are selected, as much as possible, from general terms that are widely used at present while taking into consideration the functions obtained in accordance with the embodiments, these terms may be replaced by other terms based on intensions of those skilled in the art, customs, emergence of new technologies, or the like. Also, in a particular case, terms that are arbitrarily selected by the applicant may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

Moreover, although the embodiments will be described herein in detail with reference to the accompanying drawings and content described in the accompanying drawings, it should be understood that the disclosure is not limited to or restricted by the embodiments.

With recent advances in manufacturing technology of portable devices, portable devices have been reduced in size. The present disclosure relates to a movable electronic device, and will hereinafter be referred to as a portable device. The term "portable device" includes a variety of electronic devices having mobility. For instance, the portable device includes electronic devices, such as a cell phone, smart-phone, Personal Digital Assistant (PDA), lap-top computer, tablet PC, MP3 player, CD player, DVD player, and the like. Hereinafter, the portable device may simply be called a device.

Figure 1:
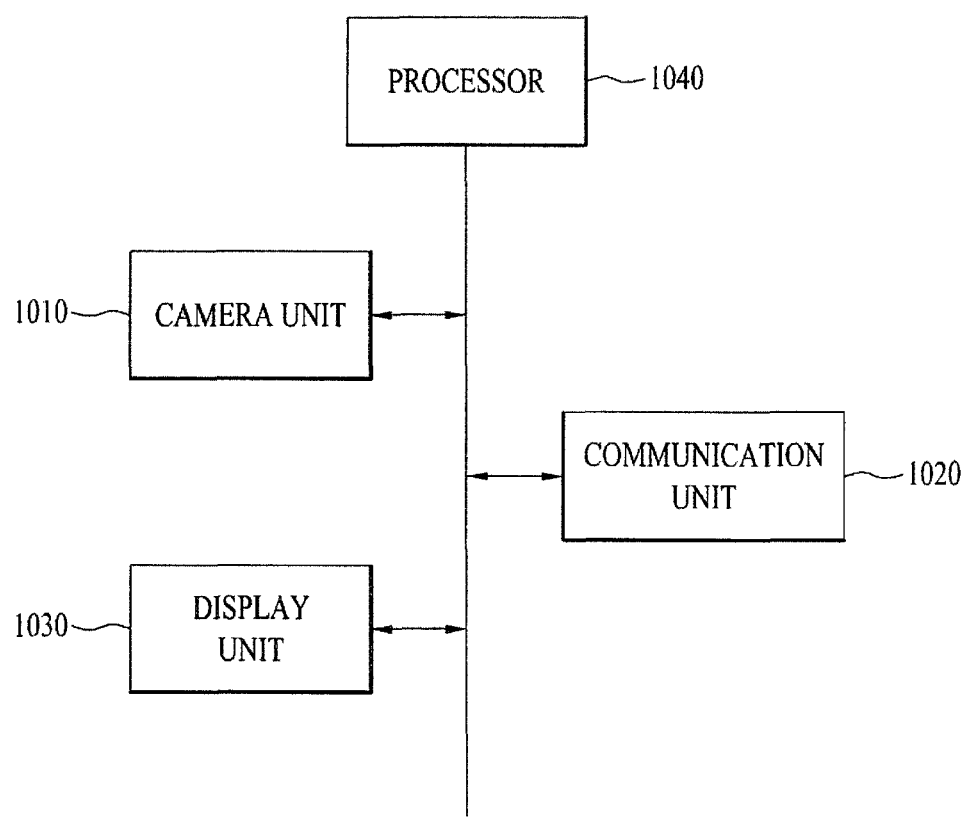
FIG. 1 is a block diagram of a device according to an embodiment.

FIG. 1 is a block diagram of a device according to an embodiment. In FIG. 1, the portable device may include a camera unit 1010, a communication unit 1020, a display unit 1030, and a processor 1040.

The camera unit 1010 may capture an image within a view angle. More specifically, the camera unit 1010 may capture an image within a view angle of a camera sensor contained in the portable device. Moreover, the camera unit 1010 may transmit a captured result to the processor 1040.

In the present disclosure, a plurality of camera units 1010 may be contained in the device. In other words, the portable device of the present disclosure may contain the plurality of camera units 1010. In particular, in the present disclosure, the portable device may contain two camera units 1010. In this case, the respective camera units 1010 may be referred to as a first camera unit and a second camera unit. The number of the camera units 1010 may be increased or reduced according to embodiments, and are not limited to the above-described embodiment. In addition, the plurality of camera units 1010 may be mounted in the portable device in various manners. The mounting methods will hereinafter be described in greater detail with reference to FIG. 2.

The communication unit 1020 may receive and/or transmit data via communication with an external device and/or web-server using various protocols. More specifically, the communication unit 1020 may access a network in a wired or wireless manner to transmit and/or receive various digital data. In particular, in the present disclosure, the communication unit 1020 may transmit and/or receive image data, captured using the camera unit 1010, to or from the external device. In addition, the communication unit 1020 may be used to implement paring with the external device.

The display unit 1030 may display visual information. Here, the visual information may be visually recognizable information, such as images, text, moving images, photographs, pictures, and the like. In particular, in the present disclosure, the display unit 1030 may display an image captured using the camera unit 1010. The display unit 1030 may display an image that is being captured by the camera unit 1010 in real time. Thereby, the display unit 1030 may provide a user with a preview interface with respect to the image that is being captured. This will hereinafter be described in greater detail with reference to FIGS. 6 and 7.

The processor 1040 may execute various applications by processing internal data of the portable device. In addition, the processor 1040 may control the aforementioned respective units to transmit and/or receive data between the units.

In particular, in the present disclosure, the processor 1040 may control the state of the camera unit 1010. More specifically, the processor 1040 may switch the camera unit 1010 from an active state to an inactive state, or vice versa. For instance, the processor 1040 may switch the camera unit 1010 from an active state to an inactive state, or from an inactive state to an active state. Here, the active state may be a state in which power or electricity is supplied to the camera unit 1010 to allow the camera unit 1010 to capture an image. On the other hand, the inactive state may be a state in which no power or electricity is supplied to the camera unit 1010 to prevent the camera unit 1010 from capturing an image. As such, the processor 1040 may supply or not supply power or electricity to the camera unit 1010 to control the state of the camera unit 1010.

In the case of activating the camera unit 1010 contained in the portable device, the processor 1040 may activate the camera unit 1010 based on the state of the camera unit 1010 contained in the external device. More specifically, in the case of activating at least one camera unit 1010 among the plurality of camera units 1010, the processor 1040 may determine the camera unit 1010 that will be activated based on the state and/or orientation of the camera unit 1010 contained in the external device. This will hereinafter be described in greater detail with reference to FIG. 3.

According to an embodiment, the processor 1040 may generate a panoramic image using a plurality of images acquired via the camera units 1010. This will hereinafter be described in greater detail with reference to FIG. 7.

According to an embodiment, the processor 1040 may acquire various information from data received using the communication unit 1020. The following description may include a procedure of acquiring information from the received data even if the procedure will not be described repeatedly. Accordingly, in the present disclosure, the portable device may be described as directly acquiring information from the external device.

Although not shown in FIG. 1, the device may further include a storage unit, an audio input/output unit, and/or a power unit.

The storage unit may store various digital data including audio, moving images, applications, virtual images, and the like. The storage unit may be any one of various digital data storage spaces, such as a flash memory, a Random Access Memory (RAM), a Solid State Drive (SSD), and the like.

In addition, the storage unit may temporarily or permanently store data received from an external source through the communication unit 1020. In this case, the storage unit may be used for buffering to allow the portable device to output data received from an external source. Meanwhile, the portable device may selectively contain the storage unit.

The audio output unit (not shown) may include audio output means, such as a speaker, earphone, and the like. In addition, the audio output unit may output voice based on control of the processor 1040 or content executed by the processor 1040. In this case, the portable device may selectively include the audio output unit.

The power unit (not shown) is a power source connected to a battery inside the portable device or an external power source, and may supply power to the portable device.

Hereinafter, in the case in which each step or operation implemented by the portable device begins or proceeds via an input, a procedure of generating or receiving a signal based on the input is included in a description of the above step or operation even though the procedure is not described repeatedly. In addition, the processor 1040 may be described as controlling the portable device or at least one unit contained in the portable device based on the input. In addition, description may be given by identically treating the processor 1040 as the portable device.

In FIG. 1 as a block diagram of the device according to one embodiment, separately shown blocks logically distinguish elements of the portable device. Accordingly, the elements of the above-described portable device may be mounted as a single chip or a plurality of chips based on device design.

Figure 2:
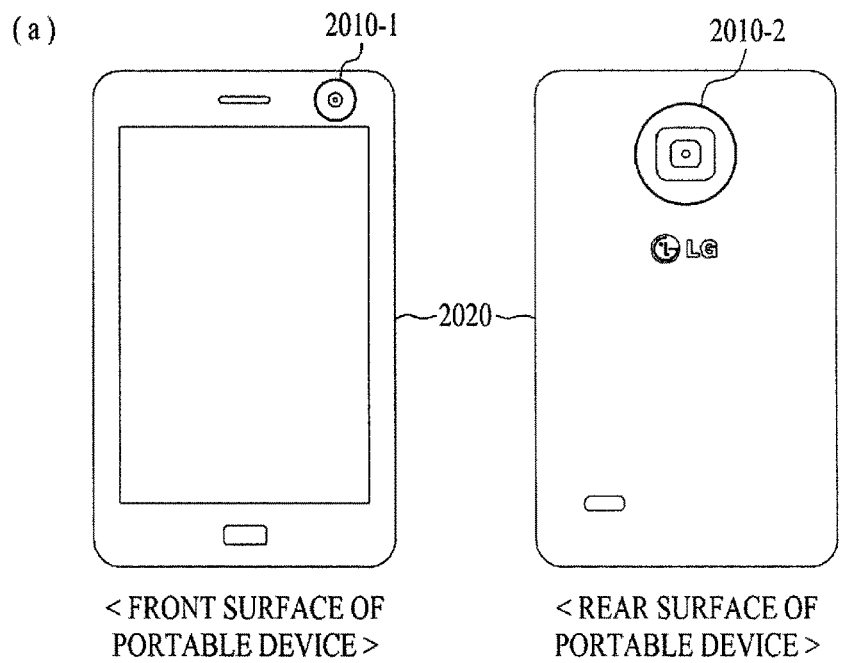
FIG. 2 is a view showing an embodiment of a portable device and a wearable device.
Figure 2:
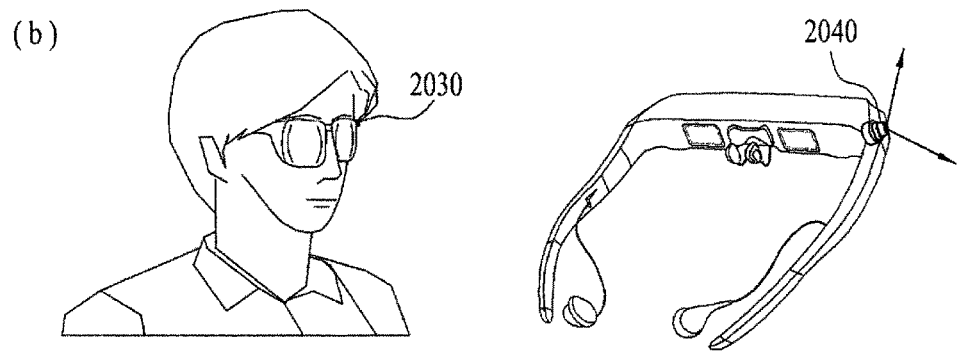
Figure 2:
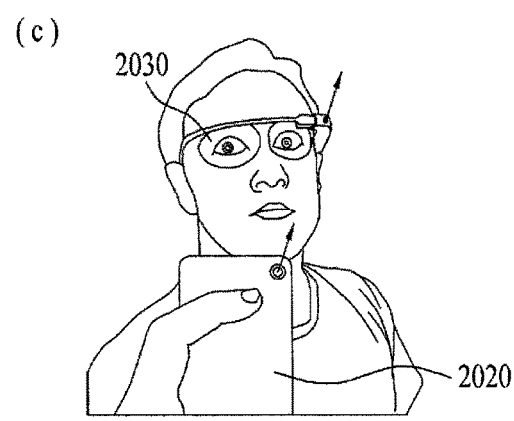

FIG. 2 is a view showing an embodiment of a portable device and a wearable device.

As described above with reference to FIG. 1, a portable device 2020 may contain a plurality of camera units. In this case, the plurality of camera units may be located at different surfaces of the portable device 2020. For instance, assuming that the portable device 2020 contains two camera units, as exemplarily shown in FIG. 2(*a*), the two camera units 2010-1 and 2010-2 may be located respectively at a front surface and a rear surface of the portable device 2020. Locating the plurality of camera units at opposite surfaces serves to further enhance utility of the camera units.

Although not shown in the drawing, the plurality of camera units may be located at different positions of the same surface of the portable device 2020. For instance, assuming that the portable device 2020 contains two camera units, the two camera units may be located at upper and lower positions of one surface of the portable device 2020. This serves to acquire an image in a wider view angle, and the portable device may generate a single successive panoramic image by editing images captured by each of the plurality of camera units.

The following description focuses on the portable device 2020 containing the camera units 2010-1 and 2010-2 respectively provided at the front and rear surfaces thereof as exemplarily shown in FIG. 2(*a*). For convenience of description, the camera unit provided at the front surface of the portable device 2020 will be referred to as the first camera unit 2010-1 and the camera unit provided at the rear surface of the portable device 2020 will be referred to as the second camera unit 2010-1. It is noted that the portable device 2020 of the present disclosure is not limited to the present embodiment, and may be freely modified within a range as those skilled in the art will readily comprehend.

The plurality of camera units 2010-1 and 2020-2 contained in the portable device 2020 of the present disclosure may be controlled according to the state of a camera unit 2040 contained in an external device 2030. In this case, the external device 2030 may be an electronic device containing the camera unit 2040. In particular, the external device 2030 may be a wearable device. The wearable device is an electronic device that the user may naturally wear like clothes, watches, glasses, and accessories. For instance, the wearable device may be various electronic devices, such as a wearable Head Mounted Display (HMD) device, smart-watch, smart-ring, and the like.

In the following description, the external device 2030 will be described as the HMD device as exemplarily shown in FIG. 2(*b*). In addition, for convenience of description, a camera unit contained in the HMD device will be referred to as a third camera unit 2040.

The user may capture an image using the plurality of camera units 2010-1 and 2010-2 provided in the single device 2020, or may capture an image using the plurality of camera units 2010-1, 2010-2, and 2040 provided in the plurality of devices 2020 and 2030. For instance, as exemplarily shown in FIG. 2(*c*), the user may capture an image using the camera units 2010-1, 2010-2, and 2040 provided in the external device 2030 and the portable device 2020.

In the case of capturing images using both the portable device 2020 and the external device 2030, it is necessary to determine which one of the plurality of camera units 2010-1 and 2010-2 provided in the portable device 2020 will first be activated. In the present disclosure, the portable device 2020 may control activation of the plurality of camera units 2010-1 and 2010-2 according to the state of the third camera unit 2040. This will hereinafter be described in greater detail with reference to FIG. 3.

Figure 3:
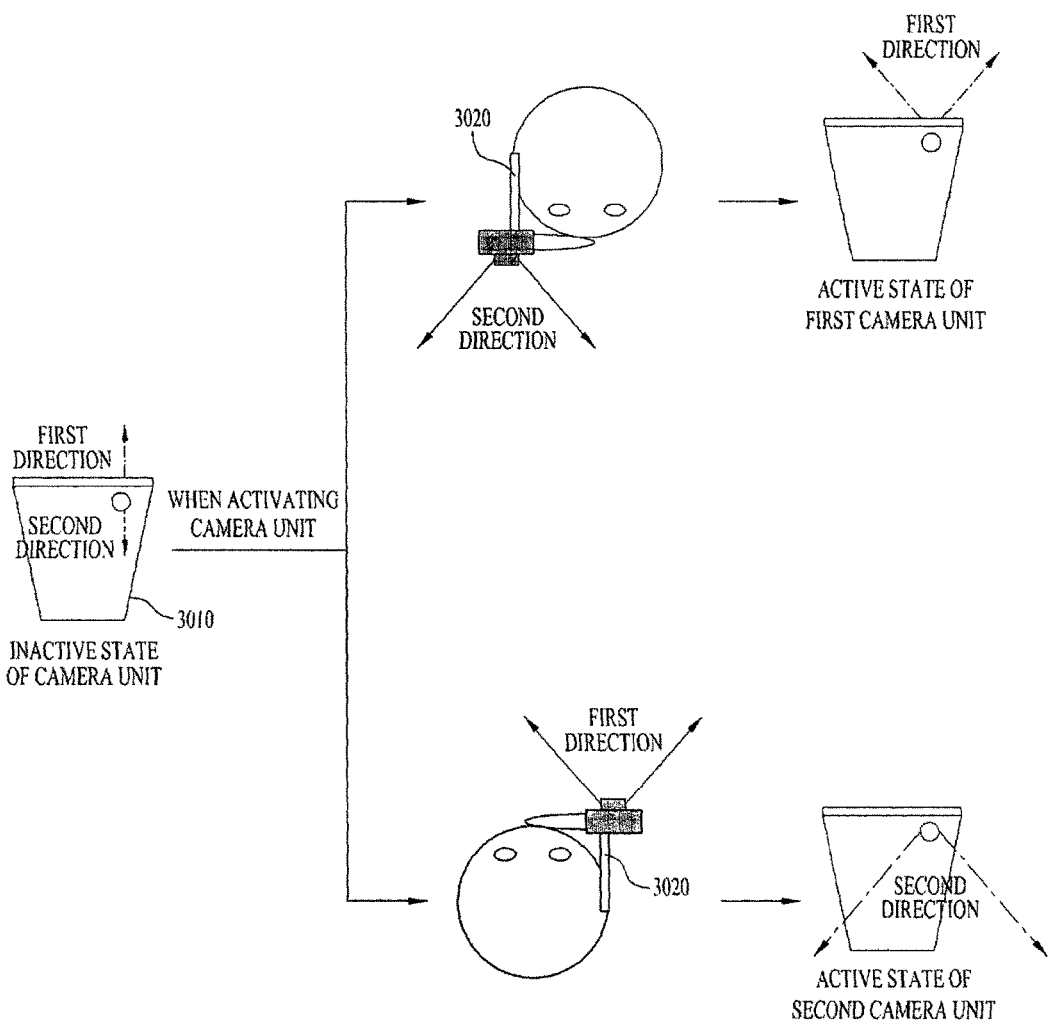
FIG. 3 is a view showing an embodiment of a portable device configured to control activation of a first camera unit and a second camera unit according to the state of a third camera unit.

FIG. 3 is a view showing an embodiment of a portable device configured to control activation of a first camera unit and a second camera unit according to the state of a third camera unit. In the following description, the direction in which the first camera unit is oriented will be referred to as a first direction, and the direction in which the second camera unit is oriented will be referred to as a second direction.

In the case of activating a first camera unit and/or a second camera unit, a portable device 3010 may first detect the state of a third camera unit. More specifically, the portable device 3010 may detect whether the third camera unit is in an active state or in an inactive state. In this case, the portable device 3010 may detect the state of the third camera unit via various methods.

In one embodiment, the portable device 3010 may acquire information regarding the state of the third camera unit from an external device 3020 using a communication unit. More specifically, the portable device 3010 may implement communication with the external device 3020, thereby receiving information regarding the state of the third camera unit. In this case, the external device 3020 may be an electronic device paired with the portable device 3010.

In another embodiment, the portable device 3010 may detect the state of the third camera unit using a camera unit. For instance, if the external device 3020 includes an LED light that indicates activation of the third camera unit, the portable device 3010 may detect the state of the third camera unit by detecting the LED light. More specifically, the portable device 3010 may detect activation of the third camera unit by detecting LED light emitted from the third camera unit.

In addition, the portable device 3010 may detect the state of the third camera unit using various sensors provided in the portable device 3010, and is not limited to the above description.

If it is detected that the third camera unit is in an inactive state via the above-described various methods, the portable device 3010 may activate the most recently activated camera unit. Alternatively, the portable device 3010 may activate a predetermined camera unit according to camera setting information.

Conversely, if it is detected that the third camera unit is in an active state, the portable device 3010 may detect the direction of the third camera unit. Here, the direction of the third camera unit may be an image capture direction of the activated third camera unit. In addition, the direction of the third camera unit may be a direction relative to the direction of the first camera unit and the direction of the second camera unit. The portable device 3010 may detect the direction of the third camera unit via various methods as will be described hereinafter.

In one embodiment, the portable device 3010 may detect the direction of the third camera unit using the first camera unit and the second camera unit. More specifically, the portable device 3010 may detect an image of the third camera unit from images captured by the first camera unit and the second camera unit. In this case, the portable device 3010 may detect the direction of the third camera unit as any one camera unit detects an image of the third camera unit. For instance, if an image of the third camera unit is detected from a first image captured by the first camera unit, the portable device 3010 may detect that a direction of the first camera unit is different from a direction of the third camera unit. Alternatively, if an image of the third camera unit is detected from a second image captured by the second camera unit, the portable device 3010 may detect that the second camera unit and the third camera unit are in different direction.

In another embodiment, the portable device 3010 may detect the direction of the third camera unit using a plurality of camera units and a communication unit. More specifically, the portable device 3010 may detect the direction of the third camera unit relative to the first camera unit and the second camera unit via comparison of images captured by the first camera unit to the third camera unit. For instance, if an image captured by the first camera unit coincides with an image captured by the third camera unit over a predetermined region, the portable device 3010 may judge that the third camera unit and the first camera unit are oriented in the same direction. The present embodiment will hereinafter be described in greater detail with reference to FIG. 6.

In addition, the portable device 3010 may detect the direction of the third camera unit using various sensors provided in the portable device 3010, and is not limited to the above description.

If the direction of the third camera unit is detected, the portable device 3010 may activate the first camera unit and/or the second camera unit in a different direction from the detected direction of the third camera unit. For instance, if it is detected that the third camera unit is oriented in a second direction, the portable device 3010 may activate the first camera unit that is oriented in a first direction. Alternatively, if it is detected that the third camera unit is oriented in a first direction, the portable device 3010 may activate the second camera unit that is oriented in a second direction. In addition, if it is detected that the third camera unit is oriented in a direction other than the first direction and the second direction, the portable device 3010 may simultaneously activate both the first camera unit and the second camera unit. This will hereinafter be described in greater detail with reference to FIG. 7.

The reason why a camera unit, in a different direction from the direction of the third camera unit, is activated is to capture images at various angles by preferentially activating a camera unit in a different direction from the direction of a previously activated camera unit. In addition, the reason why the user activates a plurality of camera units is because the user wishes to capture different images at different angles, rather than capturing the same image repeatedly. However, it is noted that according to a capture mode, the portable device may activate a camera unit in the same direction as the direction of the third camera unit. This will hereinafter be described in greater detail with reference to FIG. 6.

If the state of the first camera unit, the second camera unit, and the third camera unit is switched, the portable device 3010 may provide a notification that indicates switching of the state. In this case, the portable device 3010 may provide various forms of notifications, such as visible, audible, tactile notifications, and the like. For instance, in the case of providing a visible notification upon switching of the state of the camera unit, the portable device 3010 may display a notification message "First camera unit is activated".

In the present disclosure, that camera units are oriented in the same direction or in different direction means that the camera units are oriented in substantially the same direction or in substantially different direction within an allowable tolerance range. Accordingly, in the case in which view angles of the respective camera units coincide with one another over a predetermined region, this may be interpreted as meaning that the respective camera units are oriented in the same direction. In addition, in the case in which view angles of the respective camera units coincide with one another within a predetermined region, this may be interpreted as meaning that the respective camera units are oriented in different directions.

Figure 4:
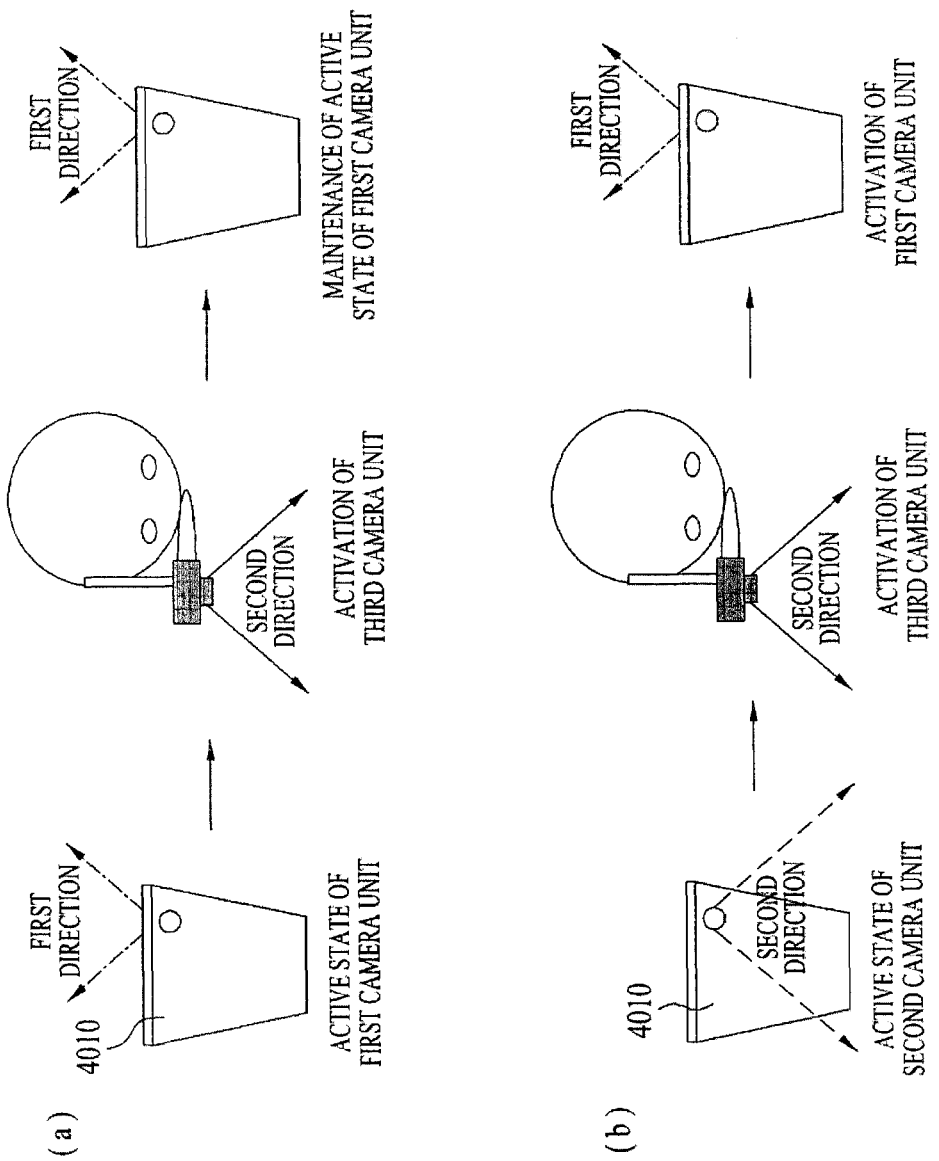
FIG. 4 is a view showing an embodiment of a portable device configured to maintain or switch the state of a first camera unit and/or a second camera unit according to switching of the state of a third camera unit.

FIG. 4 is a view showing an embodiment of a portable device configured to maintain or switch the state of a first camera unit and/or a second camera unit according to switching of the state of a third camera unit.

A first camera unit and/or a second camera unit, which is in an active state, may be controlled according to the direction of the third camera unit that switches from an inactive state to an active state. In other words, if activation of the third camera unit is detected in an active state of the first camera unit and/or the second camera unit, a portable device 4010 may activate a camera unit in a different direction from the direction of the third camera unit. If the camera unit in the different direction is in an active state, the portable device 4010 may maintain the camera unit in an active state.

For instance, if activation of the third camera unit is detected in an active state of the first camera unit, the portable device 4010 may detect the direction of the third camera unit. In this case, the direction of the third camera unit may be detected via various methods. This has been described above with reference to FIG. 3. If a detected direction of the third camera unit is a second direction, the portable device 4010 may maintain the first camera unit in an active state. Conversely, if activation of the third camera unit that is oriented in the second direction is detected in an active state of the second camera unit, the portable device 4010 may switch the second camera unit from the active state to an inactive state, and simultaneously activate the first camera unit.

This serves to preferentially activate a camera unit, in a different direction from the direction of the additionally activated third camera unit, and to assist the user in capturing images at various angles as described above.

In consideration of the above description, the state of the first camera unit and/or the second camera unit may be switched or maintained even when the third camera unit switches from an active state to an inactive state. In this case, differently from the above-described embodiment, a camera unit, in the same direction as the direction of the third camera unit, may be activated. For instance, if the third camera unit, oriented in a first direction, switches from an active state to an inactive state, the portable device 4010 may switch the first camera unit from an inactive state to an active state. In this case, if the first camera unit has previously been in an active state, the portable device 4010 may maintain the first camera unit in an active state. Alternatively, instead of automatically switching the state of the camera unit, the portable device 4010 may provide the user with a selection interface for switching of the state of the camera unit. That is, the portable device 4010 may provide the selection interface simultaneously with inactivation of the third camera unit, and the user may select a camera unit that the user wishes to directly activate via the selection interface.

Figure 5:
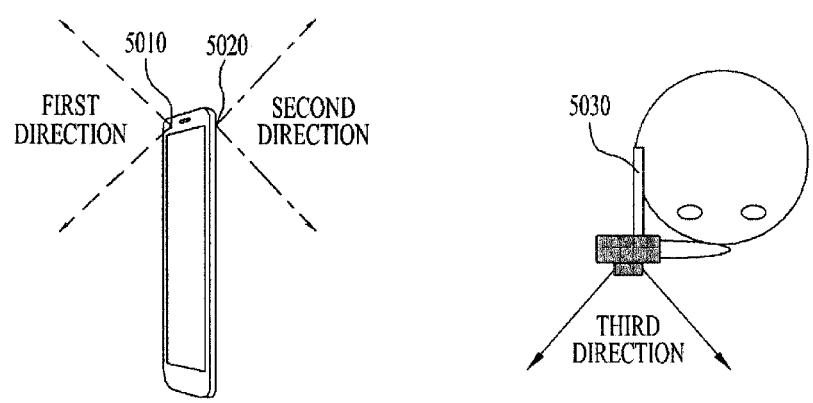
FIG. 5 is a view showing an embodiment of a portable device and an external device.

FIG. 5 is a view showing an embodiment of a portable device and an external device.

The case in which the direction of the third camera unit is a first direction or second direction has been described above. That is, the case in which the third camera unit is in the same direction as the direction of a first camera unit 5010 or a second camera unit 5020 has been described above.

Hereinafter, operation of the portable device in the case in which the direction of a third camera unit provided in an external device 5030 is a third direction will be described in detail.

Figure 6:
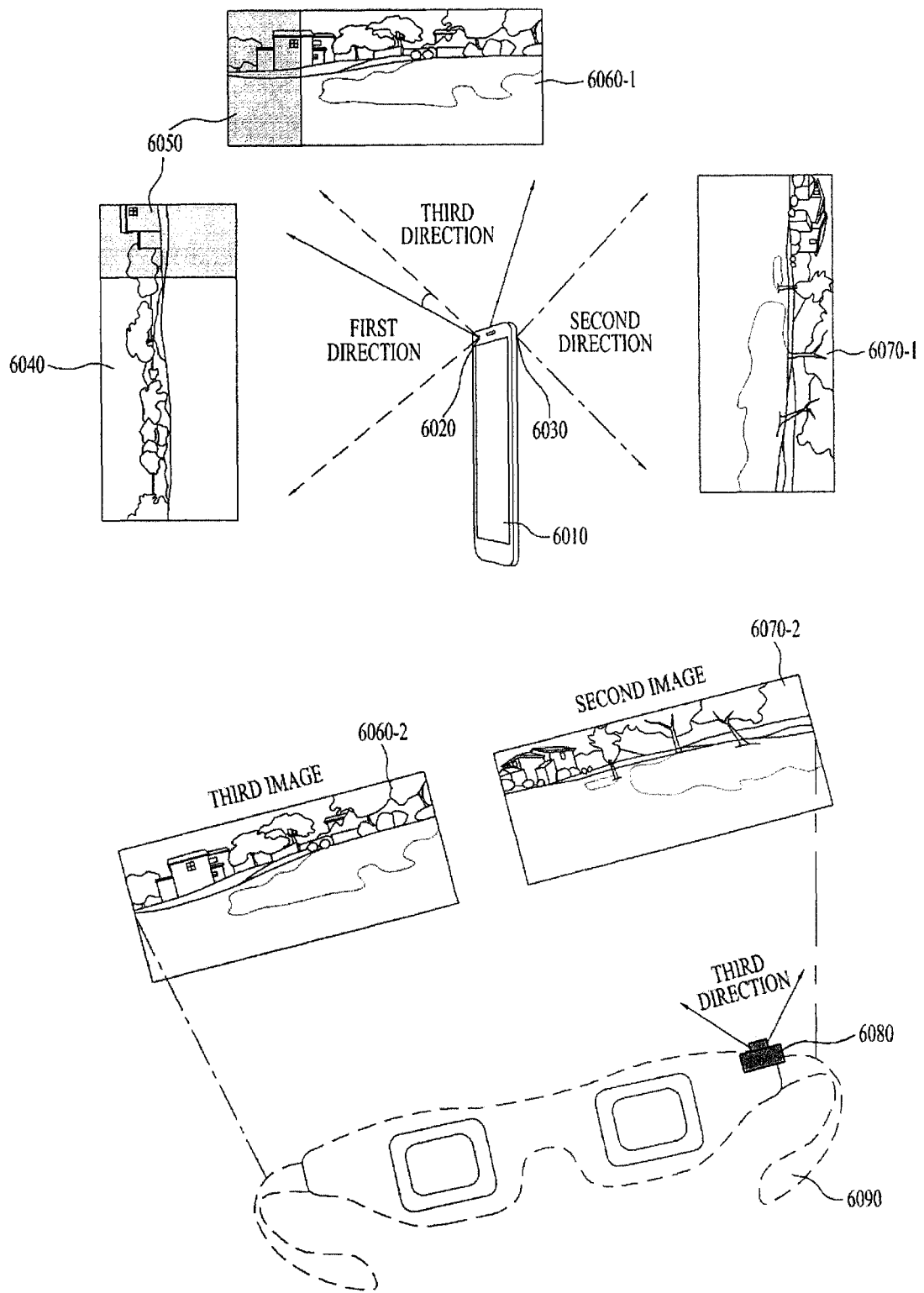
FIG. 6 is a view showing an embodiment of a portable device and an external device, which are configured to capture a plurality of images.

FIG. 6 is a view showing an embodiment of a portable device and an external device, which are configured to capture a plurality of images.

A portable device 6010, as described above with reference to FIG. 3, may detect a third direction using a plurality of camera units and a communication unit. More specifically, the portable device 6010 may detect a third direction by judging how much the view angle of a third camera unit 6080 coincides with the view angle of a first camera unit 6020 and the view angle of a second camera unit 6030 using the above-described units.

The portable device 6010, first, may acquire a first image 6040 in a first direction, a second image 6070-1 in a second direction, and a third image 6060-1 in a third direction. The portable device 6010 may compare the acquired first and second images 6040 and 6070-1 with the third image 6060-1 to judge a coincidence degree of the view angles. In this case, the portable device 6010 may acquire the third image 6060-1 from an external device 6090 using a communication unit. Upon detecting, as a comparison result, that the first image 6040 and/or the second image 6070-1 coincides with the third image 6060-1 over a predetermined region, the corresponding image may be judged as an image in the same direction as the third direction. In other words, if a region 6050 where the first image 6040 and/or the second image 6070-1 overlaps with the third image 6060-1 exceeds a predetermined region, the corresponding image may be judged as an image in the third direction. Alternatively, if it is detected that the first image 6040 and/or the second image 6070-1 coincides with the third image 6060-1 within the predetermined region, the corresponding image may be judged as an image in a different direction from the third direction. In other words, if a region where the first image 6040 and/or the second image 6070-1 overlaps with the third image 6060-1 is within the predetermined region, the corresponding image may be judged as an image in a different direction from the third direction.

Although the portable device 6010 may directly implement the above-described judgment by directly comparing the images with one another as described above, the portable device 6010 may implement the above-described judgment by receiving information regarding image comparison from the external device 6090. That is, a subject of image comparison may be the external device 6090, and the external device 6090 may transmit a result of the comparison to the portable device 6010. In this case, the external device 6090 may receive the first image 6040 and the second image 6070-1 from the portable device 6010 and compare the received image with the third image 6060-1, thereby judging a coincidence degree of the view angles.

If the third direction is detected, the portable device 6010 may activate a camera unit in a different direction from the third direction. Once the camera unit has been activated, the portable device 6010 may display an image that is being captured by the activated camera unit in real time, thereby providing a preview interface for the image that is being captured. In particular, the portable device 6010 may provide a preview interface 6060-2 for the third image 6060-1 upon receiving information regarding the third image 6060-1 from the external device 6090. The user may acquire information regarding an image that is being captured by the camera unit via the preview interfaces 6060-2 and 6070-2.

In this way, the portable device 6010 may not only directly provide the preview interfaces 6060-2 and 6070-2, but also transmit information regarding an image that is being captured to the external device 6090 so as to allow the external device 6090 to provide the preview interfaces 6060-2 and 6070-2. In particular, the preview interfaces for the first image 6040 and the second image 6070-1 may be provided as the portable device 6010 transmits information regarding the first image 6040 and the second image 6070-1 to the external device 6090.

Figure 7:
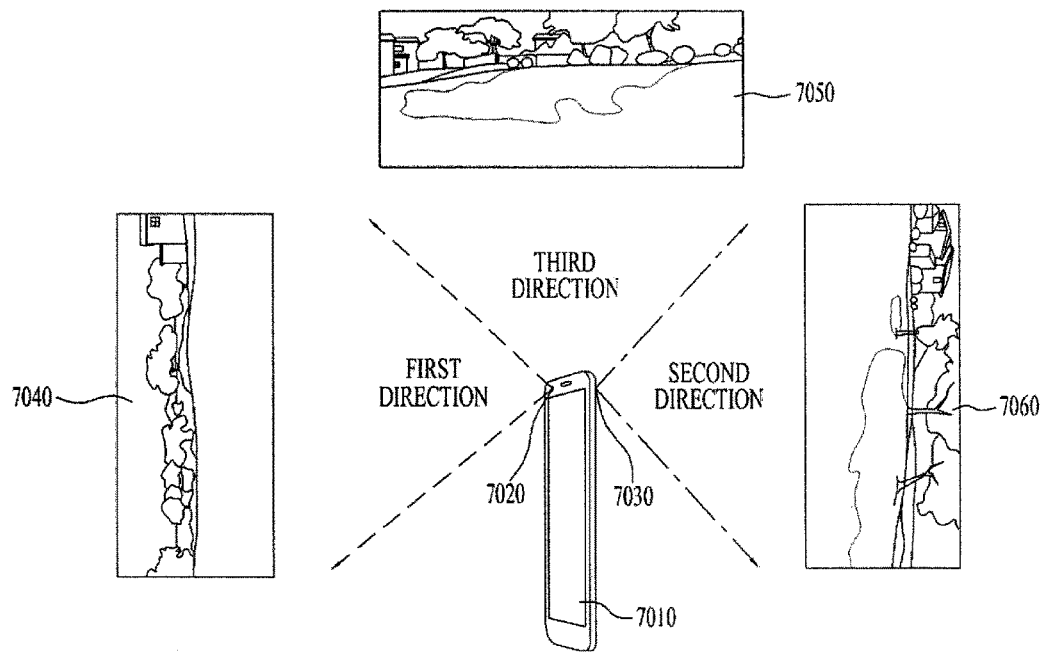
FIG. 7 is a view showing an embodiment of a portable device and an external device, which are configured to capture a plurality of images and generate a panoramic image.
Figure 7:
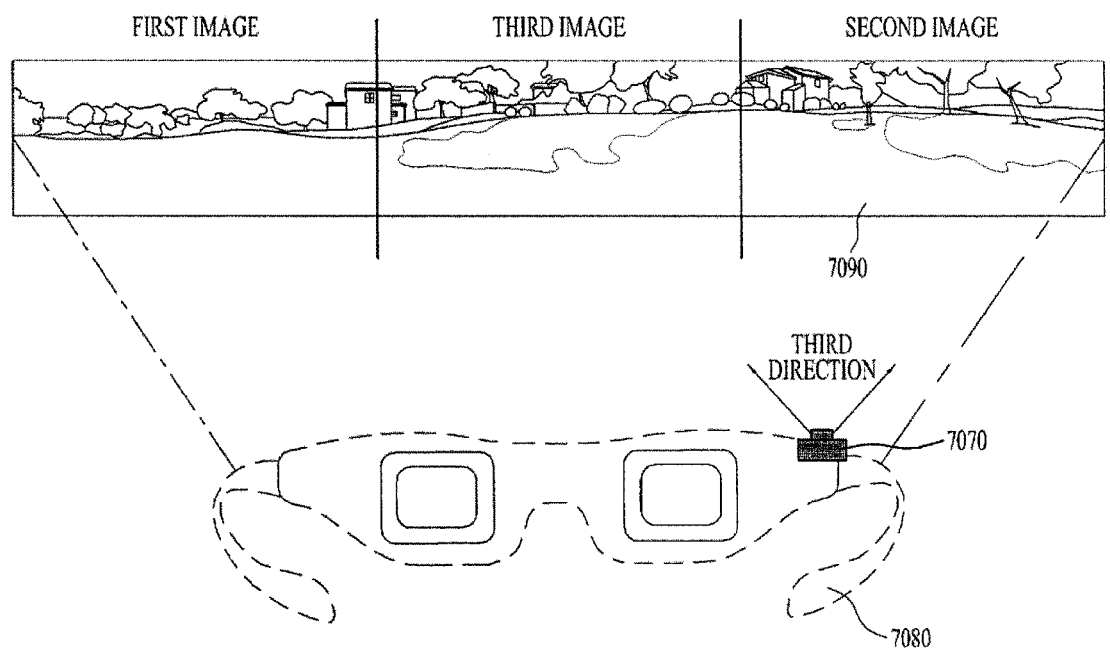

FIG. 7 is a view showing an embodiment of a portable device and an external device, which are configured to capture a plurality of images and generate a panoramic image.

If it is detected that a third direction is different from a first direction and a second direction, a portable device 7010 may activate both a first camera unit 7020 and a second camera unit 7030. That is, the portable device 7010 may simultaneously capture images 7040, 7050, and 7060 in different three directions by activating all three camera units. Accordingly, the portable device 7010 may simultaneously capture the three images 7040, 7050, and 7060 in different directions.

In this case, in one embodiment, the portable device 7010 may combine the images 7040, 7050, and 7060 in three directions to generate a single panoramic image 7090. In particular, if the portable device 7010 detects that partial boundary regions of the three images 7040, 7050, and 7060 overlap with one another, the portable device 7010 may generate a single successive panoramic image 7090 on the basis of the overlapping boundary regions. More specifically, the portable device 7010 may generate a single successive long panoramic image 7090 via image processing of the overlapping boundary regions. Thereby, the portable device 7010 may acquire a single image 7090 within a wider view angle.

In this case, the portable device 7010 may provide a preview interface for the panoramic image 7090 to allow the user to easily generate the desired panoramic image 7090. The preview interface, as described above with reference to FIG. 6, may be provided by displaying the images 7040, 7050, and 7060 that are being captured by the respective camera units in real time. As a result of providing an image processing result for the overlapping regions through provision of the preview interface for the panoramic image 7090, the portable device 7010 may previously provide information regarding the panoramic image 7090 to be acquired by the user. In addition, the portable device 7010 may transmit information regarding the preview interface to an external device 7080, thereby providing the user with information regarding the panoramic image 7090 via the external device 7080. The user may acquire the desired panoramic image 7090 by adjusting the direction of the camera unit when viewing the preview interface.

The portable device 7010 of the present disclosure may provide various capture modes. In particular, in the present embodiment, the portable device 7010 may provide a panoramic capture mode. The panoramic capture mode is a mode to acquire the panoramic image 7090. More specifically, the panoramic capture mode may be a capture mode to generate the single panoramic image 7090 via processing of images acquired via a plurality of camera units.

In consideration of characteristics of the panoramic capture mode, in the case of activating the first camera unit 7020 and/or the second camera unit 7030, the camera unit, in the same direction as the direction of a third camera unit 7070, may be preferentially activated. In the above-described embodiment with regard to FIG. 3, the camera unit, in a different direction from the direction of the third camera unit 7070, is preferentially activated to capture images at various angles. However, since the panoramic capture mode is a capture mode to generate the single successive image 7090, the portable device 7010 may preferentially activate the camera unit in the same direction as the direction of the third camera unit 7070 in the panoramic capture mode. Here, the same direction, as described above, represents a direction in which view angles overlap one another over a predetermined region. Accordingly, the portable device 7010 may generate the single successive panoramic image 7090 by processing images in the same direction on the basis of the overlapping regions.

If no camera unit in the same direction as the direction of the third camera unit 7070 exists in the panoramic capture mode, the portable device 7010 may simultaneously activate both the first camera unit 7020 and the second camera unit 7030 to generate the single successive long panoramic image 7090. An embodiment of generating the single successive panoramic image 7090 using three camera units corresponds to the above-described embodiment.

The portable device 7010 may provide various capture modes in addition to the panoramic capture mode, and may control activation of the camera unit according to the capture mode. This will hereinafter be described in greater detail with reference to FIG. 11.

Figure 8:
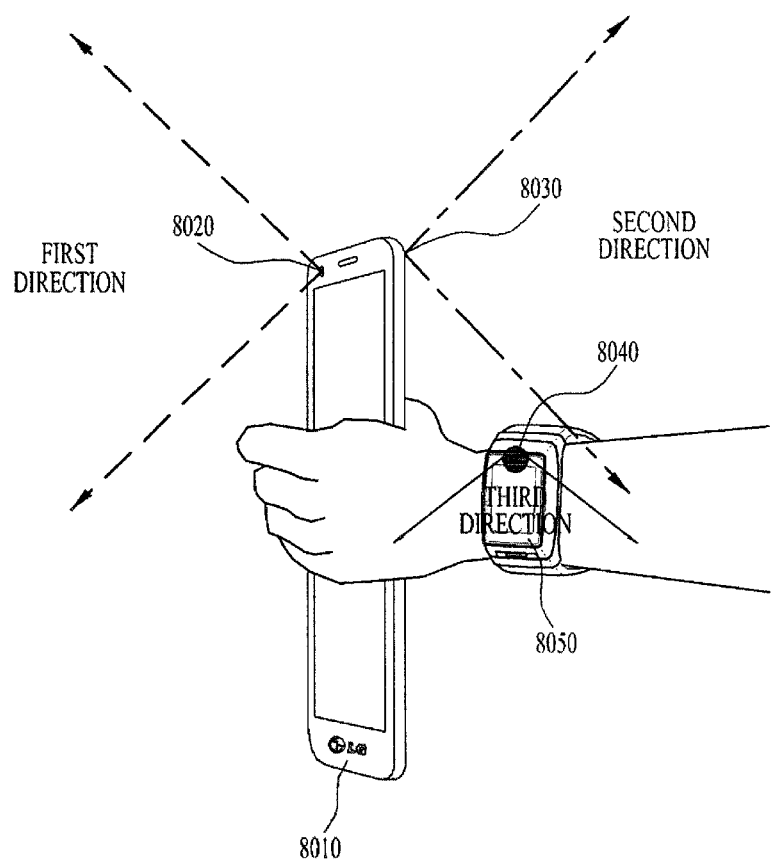
FIG. 8 is a view showing an embodiment of a portable device and an external device, which are configured to capture a plurality of images.

FIG. 8 is a view showing an embodiment of a portable device and an external device, which are configured to capture a plurality of images. In particular, the drawing shows an embodiment in which an external device 8050 is a smart-watch. Even in the case in which the external device 8050 is a smart-watch, the above-described embodiments may be equally or similarly applied. Accordingly, a portable device 8010 may control activation of a first camera unit 8020 and/or a second camera unit 8030 according to the state and direction of a third camera unit 8050 contained in the smart-watch 8050.

Figure 9:
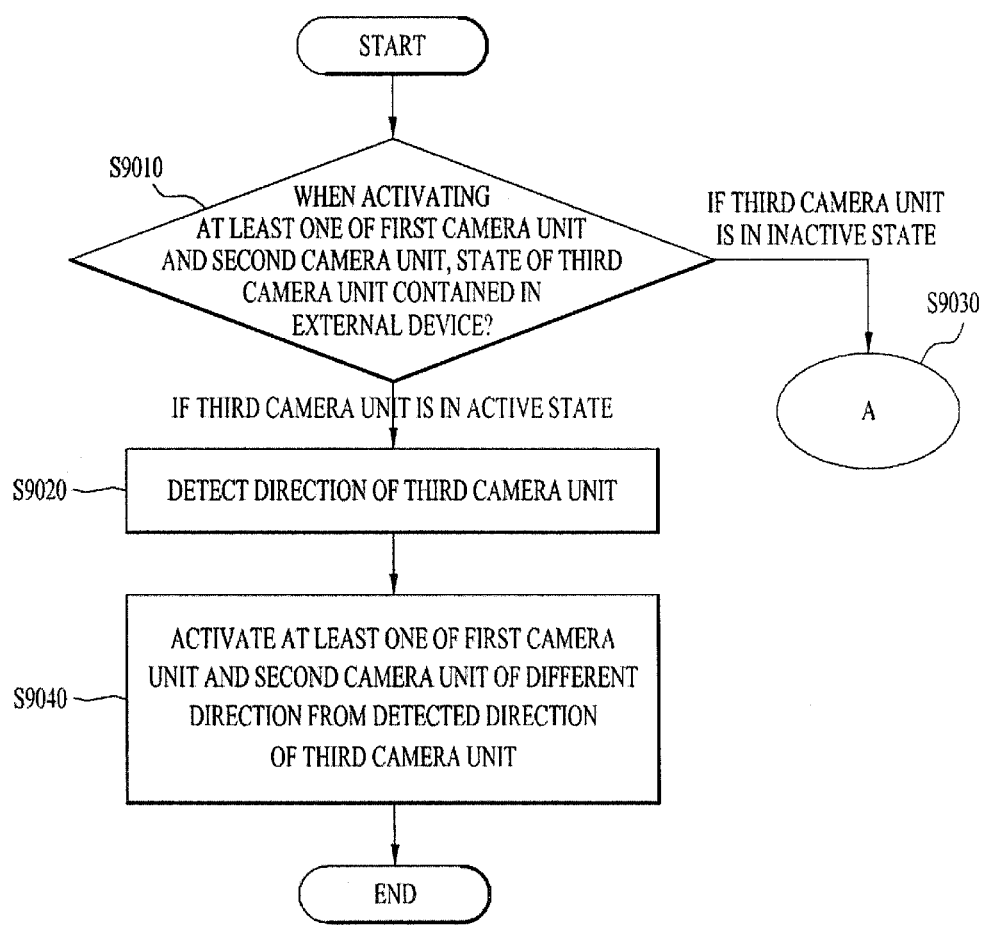

FIG. 9 is a flowchart of a control method of a portable device according to one embodiment. In particular, the flowchart illustrates a method of activating a first camera unit and/or a second camera unit according to the state and the direction of a third camera unit. In the flowchart, a detailed description of parts similar to or repeated parts of the above description with reference to FIGS. 1 to 8 will be omitted.

First, in the case of activating at least one of a first camera unit and a second camera unit, the portable device may detect the state of a third camera unit contained in an external device (S9010). Here, the state of the camera unit may include an active state and an inactive state. The state of the third camera unit may be detected using at least one unit provided in the portable device via various methods. This has been described above in detail with reference to FIGS. 3 and 6.

If the third camera unit is in an inactive state, the portable device may enter A-operation (S9030). The A-operation will hereinafter be described in greater detail with reference to the flowchart of FIG. 10.

Conversely, if the third camera unit is in an active state, the portable device may detect the direction of the third camera unit (S9020). More specifically, upon detecting an active state of the third camera unit, the portable device may detect the direction of the third camera unit. Here, the direction of the third camera unit may be an image capture direction of the third camera unit. Likewise, the direction of the third camera unit may be detected using at least one sensor provided in the portable device via various methods. As a representative embodiment, the portable device may detect the direction of the third camera unit by comparing images captured by the first camera unit and the second camera unit with an image captured by the third camera unit. This has been described above in detail with reference to FIGS. 3 and 6.

Upon detecting the direction of the third camera unit, the portable device may activate the first camera unit and/or the second camera unit in a different direction from the detected direction of the third camera unit (S9040). This serves to assist the user in capturing images at various angles as necessary. Accordingly, if both the first camera unit and the second camera unit are oriented in different directions from the direction of the third camera unit, the portable device may activate the three camera units simultaneously. In this case, the portable device may generate a single successive panoramic image via combination of three images. This has been described above with reference to FIG. 7.

Although not shown in the flowchart, if a capture mode of the first to third camera units is a panoramic capture mode, the portable device may preferentially activate at least one camera unit in the same direction as the direction of the activated third camera unit. This serves to assist the user in generating a single successive panoramic image as necessary. This has been described above with reference to FIG. 7.

Figure 10:
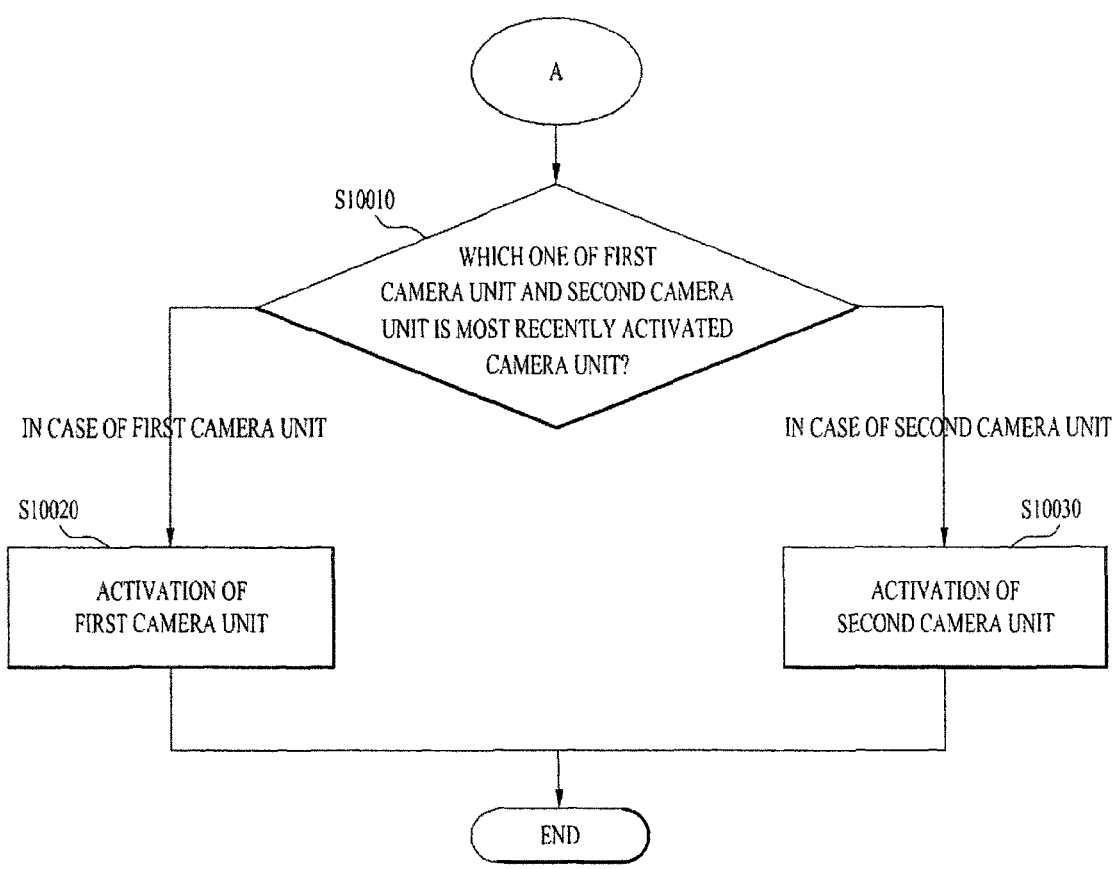

FIG. 10 is a flowchart of a control method of a portable device according to one embodiment. In particular, the flowchart corresponds to the A-operation in the flowcharts of FIGS. 9 and 11. In the present flowchart, a detailed description of parts similar to or repeated parts of the above description with reference to FIGS. 1 to 9 will be omitted.

First, the portable device may detect whether the most recently activated camera unit is a first camera unit or a second camera unit (S10010).

If the most recently activated camera unit is a first camera unit, the portable device may activate the first camera unit (S10020). In other words, if the most recently activated camera unit is a first camera unit, the portable device may switch the first camera unit from an inactive state to an active state.

Conversely, if the most recently activated camera unit is a second camera unit, the portable device may activate the second camera unit (S10030). In other words, if the most recently activated camera unit is a second camera unit, the portable device may switch the second camera unit from an inactive state to an active state.

FIG. 11 is a flowchart of a control method of a portable device according to one embodiment. In particular, the flowchart illustrates a control method of a portable device that controls activation of a first camera unit and/or a second camera unit according to a capture mode of the camera unit. In the present flowchart, a detailed description of parts similar to or repeated parts of the above description with reference to FIGS. 1 to 10 will be omitted.

First, if the portable device activates at least one of a first camera unit and a second camera unit, the portable device may detect the state of a third camera unit provided in an external device (S11010). This operation overlaps with the above description with reference to the flowchart of FIG. 9, and thus a detailed description of this operation will be omitted hereinafter.

If the portable device detects that a third camera unit is in an inactive state, the portable device may enter A-operation (S11030). A detailed description related to the A-operation has been described above with reference to FIG. 10.

Conversely, if the portable device detects that the third camera unit is in an active state, the portable device may detect whether a capture mode of the first camera unit and the second camera unit is equal to a capture mode of the third camera unit (S11020). In the flowchart, the capture mode may include a photograph capture mode for instantaneous image capture, and a moving capture mode for successive image capture.

If it is detected that capture modes of the first camera unit and the second camera unit are different from a capture mode of the third camera unit, the portable device may enter A-operation (S11030). This serves to assist the user in capturing images in the same direction in different capture modes. For instance, with regard to images in the same direction, the user may wish to capture a still image using the first camera unit and a moving image using the third camera unit. Accordingly, in the case of different capture modes, the portable device may activate a camera unit in the same direction as or in a different direction from the direction of the third camera unit according to whether or not the camera unit is the most recently activated camera unit.

However, conversely, if it is detected that capture modes of the first camera unit and the second camera unit are equal to a capture mode of the third camera unit, the portable device may detect the direction of the third camera unit (S11040). Here, the direction of the third camera unit may be an image capture direction. The direction of the third camera unit may be detected using at least one unit provided in the portable device, such as the camera unit and/or the communication unit, via various methods. A detailed description of this has been described above with reference to FIG. 3.

Next, the portable device may activate at least one of the first camera unit and the second camera unit, in a different direction from the direction of the detected third camera unit (S11050). This serves to capture images at various angles. This has been described above in detail with reference to FIG. 3.

If a capture mode of the portable device or the external device is the panoramic capture mode as described above with reference to FIG. 6, a camera unit, in the same direction as the direction of the third camera unit, may be preferentially activated. That is, if a capture mode is the panoramic capture mode, the first camera unit and/or the second camera unit, in the same direction as the direction of the third camera unit, may be preferentially activated regardless of whether capture modes of the portable device and the external device are equal to each other.

Although the respective drawings have been described individually for convenience, the embodiments described in the respective drawings may be combined to realize novel embodiments. In addition, designing a computer readable recording medium in which a program to execute the above-described embodiments is recorded according to a need of those skilled in the art is within the scope of the disclosure.

A portable device and a control method thereof according to the present disclosure are not limited to the configurations and methods of the above described embodiments, and all or some of the embodiments may be selectively combined to achieve various modifications.

Although preferred embodiments have been described and illustrated above, the present disclosure is not limited to the above-described particular embodiments, and various other alterations may be realized by those skilled in the art of the present disclosure without deviating from the scope of the claims. These alterations should not be individually understood from the technical scope or prospect of the present disclosure.

The portable device and the control method thereof according to the present disclosure may be implemented as code that may be written on a processor readable recording medium and thus read by a processor provided in a network device. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed therefrom in a decentralized manner.

As is apparent from the above description, according to one embodiment, a portable device may control activation of a plurality of camera units according to an active state of an external device.

According to another embodiment, the portable device may activate any one camera unit among a plurality of camera units, which has a different image capture direction from an image capture direction of a camera unit contained in an external device.

According to a further embodiment, it is possible to generate a single successive panoramic image using a plurality of camera units contained in a portable device and an external device.

It will be appreciated that the term 'direction' in the present disclosure may mean not only an accurate direction, but also a substantial direction within a predetermined range. That is, in the present disclosure, the term 'direction' may mean a substantial direction within an allowable tolerance range.

In addition, the disclosure describes both a device invention as well as a method invention, and descriptions of both inventions may be complementarily applied as needed.

What is claimed is:

1. A portable device comprising:
a first camera unit configured to capture a first image and a second camera unit configured to capture a second image, wherein the first camera unit is located at a front surface of the portable device and the second camera unit is located at a rear surface of the portable device respectively;
a transmitter/receiver configured to transmit and receive data to and from a wearable device; and
a processor configured to control the first camera unit, the second camera unit, and the transmitter/receiver,
wherein the processor is further configured to:
detect a state of a third camera unit contained in the wearable device when activating at least one of the first camera unit and the second camera unit, the state of the third camera unit including an active state and an inactive state, detect a direction of the third camera unit when the third camera unit is in the active state, activate at least one of the first camera unit and the second camera unit in a different direction from the detected direction of the third camera unit, and provide a notification when switching of a state of at least one of the first camera unit, the second camera unit, and the third camera unit is detected.

2. The portable device according to claim 1, wherein, when activating at least one of the first camera unit and the second camera unit in the different direction from the detected direction of the third camera unit, the processor is further configured to activate the first camera unit or the second camera unit in an opposite direction to the direction of the third camera unit.

3. The portable device according to claim 1, wherein, when activating at least one of the first camera unit and the second camera unit, the processor is further configured to:

receive state information regarding the state of the third camera unit from the wearable device, and detect the state of the third camera unit from the state information.

4. The portable device according to claim 1, wherein the processor is further configured to activate the most recently activated camera unit among the first camera unit and the second camera unit when the third camera unit is in the inactive state.

5. The portable device according to claim 1, wherein the processor is further configured to activate at least one of the first camera unit and the second camera unit by comparing the first image and the second image with a third image acquired by the third camera unit.

6. The portable device according to claim 5, wherein the processor is further configured to:

compare the third image with the first image and the second image, and activate the second camera unit when the third image corresponds to the first image over a predetermined region, or activate the first camera unit when the third image corresponds to the second image over the predetermined region.

7. The portable device according to claim 1, wherein the processor is further configured to:

detect the wearable device using at least one of the first camera unit and the second camera unit, and activate the first camera unit when detecting the wearable device using the first camera unit, or activate the second camera unit when detecting the wearable device using the second camera unit.

8. The portable device according to claim 1, further comprising a display configured to display visual information, wherein, when at least one of the first camera unit and the second camera unit is activated, the processor is further configured to control the display so as to display at least one of the first image and the second image.

9. The portable device according to claim 1, wherein, when at least one of the first camera unit and the second camera unit is activated, the processor is further configured to transmit image information, regarding at least one of the first image and the second image, to the wearable device.

10. The portable device according to claim 1, wherein the processor is further configured to activate the first camera unit and the second camera unit when the detected direction of the third camera unit is different from a first direction of the first camera unit and a second direction of the second camera unit.

11. The portable device according to claim 10, wherein the processor is further configured to generate a single successive panoramic image using images acquired by the first camera unit, the second camera unit, and the third camera unit when the first camera unit, the second camera unit, and the third camera unit are in the active state.

12. The portable device according to claim 1, wherein the processor is further configured to activate at least one of the first camera unit and the second camera unit, in a same direction as the detected direction of the third camera unit, when the third camera unit is in the active state and a capture mode of the third camera unit is a panoramic capture mode.

13. The portable device according to claim 1, wherein, when the first camera unit or the second camera unit is in the active state and the third camera unit is in the inactive state, the processor is further configured to activate at least one of the first camera unit and the second camera unit, in the different direction from the direction of the third camera unit when detecting that the third camera unit is switched to the active state.

14. The portable device according to claim 1, wherein, when the third camera unit as well as the first camera unit or the second camera unit of the different direction from the direction of the third camera unit are in the active state, the processor is further configured to provide a selection user interface for the first camera unit and the second camera unit when detecting that the third camera unit is switched to the inactive state.

15. The portable device according to claim 1, wherein, when activating at least one of the first camera unit and the second camera unit, the processor is further configured to activate the most recently activated camera unit among the first camera unit and the second camera unit when the third camera unit is in the active state and capture modes of the first camera unit and the second camera unit are different from a capture mode of the third camera unit.

16. The portable device according to claim 15, wherein the capture mode includes a photograph capture mode capturing the first image or the second image instantly, and a moving image capture mode capturing the first image or the second image sequentially.

17. The portable device according to claim 1, wherein the wearable device is a device paired with the portable device.

18. A control method of a portable device, the method comprising:

detecting a state of a third camera unit contained in a wearable device when activating at least one of a first camera unit configured to capture a first image and a second camera unit configured to capture a second image, wherein the state of the third camera unit includes an active state and an inactive state, wherein the first camera unit is located at a front surface of the portable device and the second camera unit is located at a rear surface of the portable device respectively;

detecting a direction of the third camera unit when the third camera unit is in the active state;

activating at least one of the first camera unit and the second camera unit in a different direction from the detected direction of the third camera unit; and providing a notification when switching of a state of at least one of the first camera unit, the second camera unit, and the third camera unit is detected.

* * * * *